(No Model.) 5 Sheets—Sheet 1.

L. H. MONTROSS.
MATCH MAKING MACHINE.

No. 541,564. Patented June 25, 1895.

WITNESSES:

INVENTOR:
Levi H. Montross.
By his atty (No Model.) 5 Sheets—Sheet 2.

L. H. MONTROSS.
MATCH MAKING MACHINE.

No. 541,564. Patented June 25, 1895.

WITNESSES: INVENTOR:

THE NORRIS PETERS CO., PHOTO-LITHO., WASHINGTON, D. C.

(No Model.) 5 Sheets—Sheet 3.

L. H. MONTROSS.
MATCH MAKING MACHINE.

No. 541,564. Patented June 25, 1895.

WITNESSES:

INVENTOR:

(No Model.) 5 Sheets—Sheet 4.

L. H. MONTROSS.
MATCH MAKING MACHINE.

No. 541,564. Patented June 25, 1895.

WITNESSES.

INVENTOR:

(No Model.) 5 Sheets—Sheet 5.

L. H. MONTROSS.
MATCH MAKING MACHINE.

No. 541,564. Patented June 25, 1895.

WITNESSES:
INVENTOR:

UNITED STATES PATENT OFFICE.

LEVI H. MONTROSS, OF CAMDEN, NEW JERSEY, ASSIGNOR OF THREE-FOURTHS TO ADOLPH SEGAL, OF PHILADELPHIA, PENNSYLVANIA.

MATCH-MAKING MACHINE.

SPECIFICATION forming part of Letters Patent No. 541,564, dated June 25, 1895.

Application filed March 17, 1894. Serial No. 504,032. (No model.)

*To all whom it may concern:*

Be it known that I, LEVI H. MONTROSS, of the city and county of Camden and State of New Jersey, have invented an Improvement in Match-Making Machines, of which the following is a specification.

My invention relates to match making machines, and consists of certain improvements which are fully set forth in the following specification and are shown in the accompanying drawings.

It is one object of my invention to accomplish the complete construction of matches by a continuous operation in a single apparatus, so that the matches may receive the least possible handling during the process of construction. In carrying out my invention in the attainment of this object I employ an endless splint carrier which passes through the splint cutting devices, where the splints are cut from a block of wood and are delivered to the carrier, thence to the vessel in which is contained the compounds which are to be applied to the splint ends, through the room or drying inclosure to permit the heads to dry, and finally about an ejecting apparatus by which the dried matches are expelled from the apron, which then passes back to the splint cutting devices.

Part of my improvements relate particularly to the splint cutting and feeding devices, and are designed to enable the splints to be rapidly and perfectly cut and fed to the moving carrier. For this purpose I employ feeding devices for feeding the carrier or apron intermittently and means to depress the moving carrier so that it is pushed upon the ends of the splints, and by this means a positive and certain splint feeding action is obtained. As the splint carrier or apron is depressed to receive the splint a shorter reciprocation of the cutters is required, and as a shorter reciprocation of the cutters requires less time, it results that greater speed may be obtained in the machine in the formation of splints without excessive speed in the reciprocation of the cutters. The cutting device cannot be reciprocated beyond a certain speed owing to the liability of heating and injuring the wood by the resulting excessive friction. So by decreasing the necessary extent of the reciprocation of the cutters by depressing the carrier to receive the splints, the speed of the machine is materially increased without increasing the reciprocating speed of the motors.

My invention also embraces improvements in the cutting devices designed to more effectively clamp the cutters in place and to permit them to be removed and unclamped, and also in the cutters themselves whereby broken cutters may be repaired and used again.

In the present application I do not claim nor limit myself to the particular construction of splint carrier shown and described, nor to the particular device for expelling the completed matches from the apron. These improvements are embraced in my Letters Patent No. 525,791, dated September 11, 1894.

I shall now refer to the drawings for the purpose of more particularly describing my invention.

Figure 17:
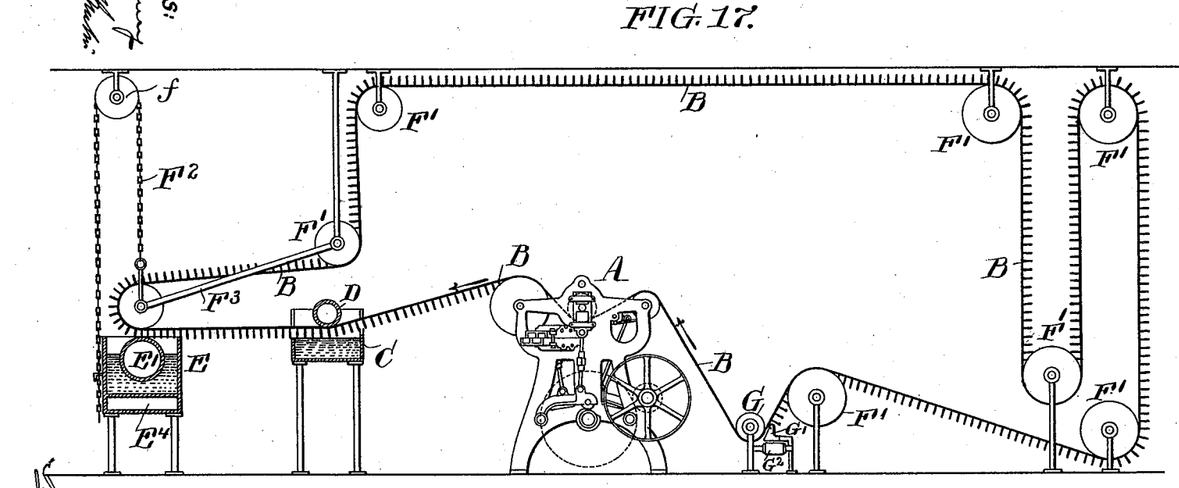
Fig. 17 is an illustrative view showing the entire match-making apparatus and illustrating the method of operation.

Referring first to Fig. 17 for a general description of the apparatus: A is the splint cutting machine, which may also act to drive the splint receiving and carrying belt or apron.

B is the splint carrying belt or apron which receives the splints from the splint cutting machine.

C is the vessel which contains the first bath of material such as paraffine, into which the ends of the splints are first dipped. Above this vessel may be arranged a guide D to direct the apron or belt B and cause the ends of the splints to be dipped in the contents of the vessel C. E is a second vessel containing igniting compound which is applied to the ends of the splints as they are carried over the vessel E by the belt or apron B.

F, F' F', &c., are guides about which the belt or apron B passes as it travels through the room to permit the matches to dry. The belt may, if desired, pass through a drying room or compartment.

G is a discharge drum, for expelling the matches from the belt or apron B.

Figure 1:
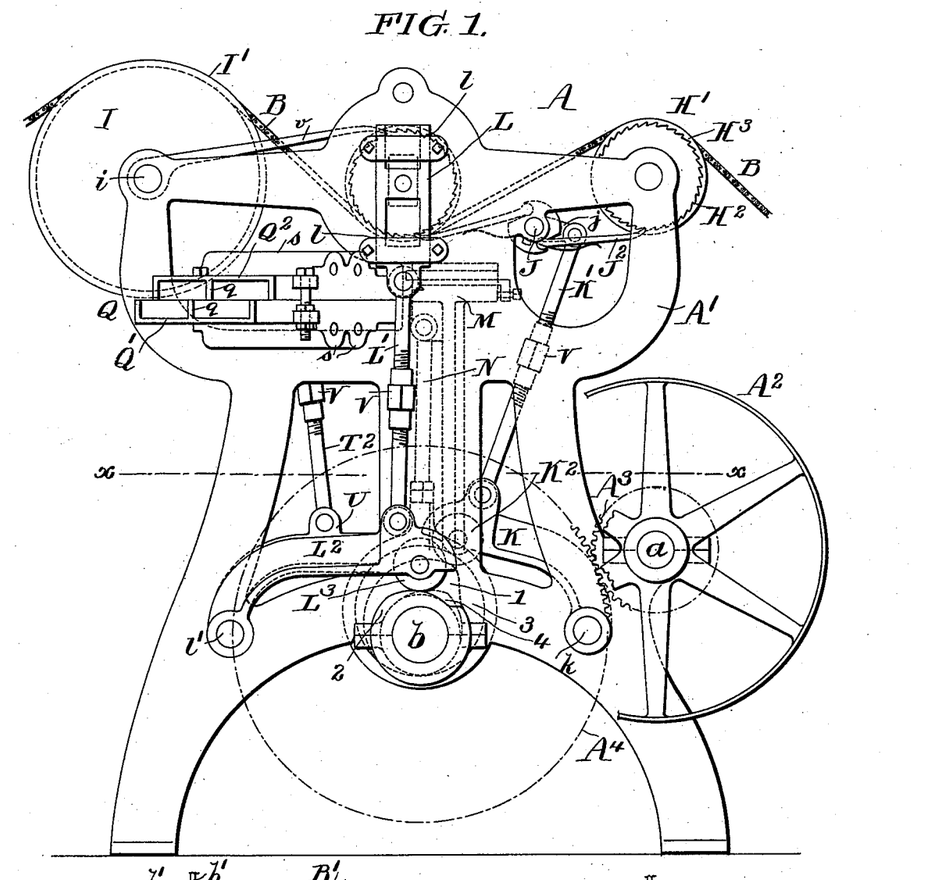
Figure 1 is a side elevation of a part of my improved match-making machine.
Figures 7, 8, 9, 10, 11, 12:
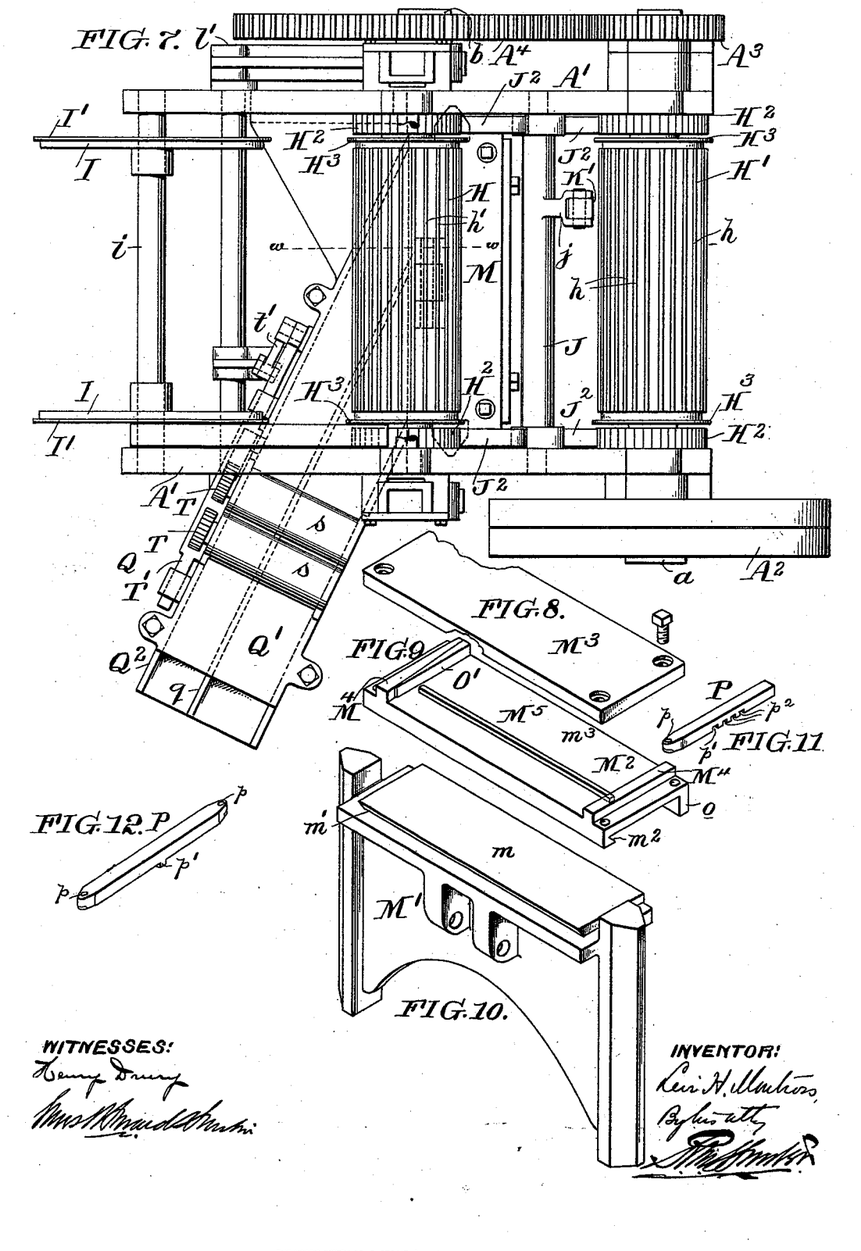
Fig. 7 is plan view of the machine with the splint receiving and carrying apron removed.
Figs. 8, 9, and 10 are respectively perspective views of the top, intermediate, and lower parts of the cutter-frame.
Fig. 11 is a perspective view of one of the splint-cutters.
Fig. 12 is a perspective view of a cutter, illustrating a modification thereof.

Referring now more particularly to the splint cutting machine A, A' A' are two suitable side frames, in which is journaled a driving shaft $a$ driven by a pulley $A^2$ or in any other convenient manner. On the drive shaft $a$ is a gear wheel $A^3$ which meshes with a gear wheel $A^4$ on a cam shaft $b$ also journaled in the frames A' A'.

Figure 2:
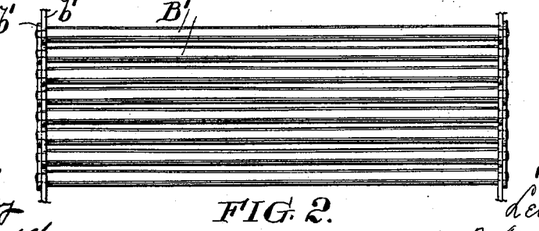
Fig. 2 is a plan view of a part of the splint receiving and carrying apron.
Figure 3:
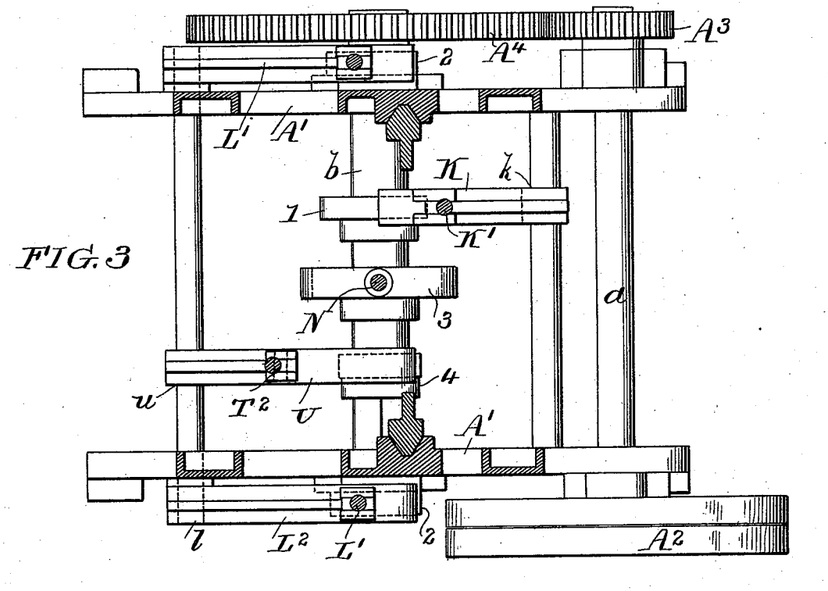
Fig. 3 is a horizontal sectional view on the line $x\,x$ of Fig. 1.
Figure 4:
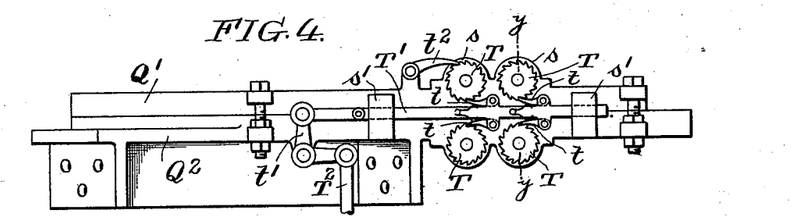
Fig. 4 is a side elevation of the mechanism for feeding the wood from which the splints are cut.
Figure 5:
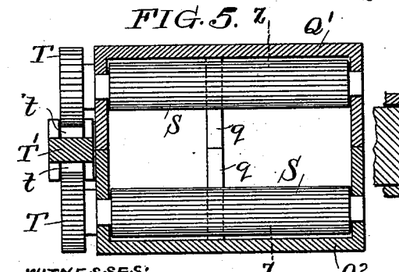
Fig. 5 is a transverse vertical sectional view of the same on the line $y\,y$ of Fig. 4 on an enlarged scale.
Figure 6:
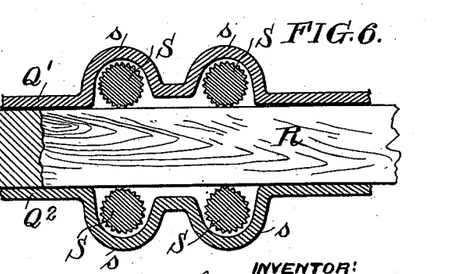
Fig. 6 is a longitudinal vertical sectional view of the same on the line $z\,z$ of Fig. 5.

H, H', are respective driving drums or cylinders journaled in the frames A' A' and adapted to drive the belt or apron B. The belt or apron B consists of a series of transversely arranged bars B' linked together at their ends by links $b'$. (See Fig. 2.) The driving drums or cylinders H, H' are grooved longitudinally so that the ribs $h$ thus formed will engage the spaces between the bars B' B' of the belt and drive it on the principle of a sprocket wheel.

I, I are guiding disks or wheels for the belt or apron B, carried by a shaft $i$ journaled in the upper part of the frames A' A'. The belt or apron B passes over the cylinder H', under the cylinder H and then over the guiding disks or wheels I, I. Suitable devices may be employed for the purpose of driving the cylinders H, H'. I prefer however to employ the mechanism shown. The cylinders H, H' are provided preferably at each end, with oppositely arranged ratchets $H^2$, and between the cylinders is journaled a rock shaft J, provided with two pawls $J^2$, $J^2$ at each end, located on opposite sides of the center of the rock shaft, and each engaging one of the ratchets $H^2$. It is apparent that when the shaft J is rocked in one direction the two pawls $J^2$, $J^2$ will both be moved outward, and each engaging its ratchet $H^2$ will turn it and the cylinders H, H', so that the two cylinders will be turned the distance of one ratchet both in opposite directions on each operation of the rock shaft J. When the shaft J rocks back, or in the opposite direction, the two pawls $J^2$ $J^2$ will be retracted and will engage the next pair of teeth, so that they will be in position to drive the cylinders again when they are moved forward. Thus there is imparted an intermittent feeding motion to the cylinders H, H' and to the belt or apron B which is driven by them.

For the purpose of rocking the shaft J, I employ a lever K fulcrumed as at $k$ and connected with an arm $j$ of the rock shaft J through a connecting rod K'. The lever K is operated by a cam $l$ on the cam shaft $b$, and may be provided with a roller $K^2$ upon its free end, which is operated by the cam. Backward rotation of the cylinders or drums H, H' may be prevented by the usual pawl $v$.

To keep the aprons properly centered and prevent lateral displacement of the apron B, as it passes over the cylinders H, H' the cylinders may be provided at their ends with annular flanges $H^3$. The guide disks or wheels I may be similarly provided with annular flanges I'. As the cylinders H, H' are rotated to impart an intermittent feeding motion to the apron B, a slight rising and falling movement is imparted to the cylinder H, so as to slightly depress the apron B, at the moment a row of match splints are delivered by the cutters to the space between a pair of bars B', B' as will be more fully described hereinafter. To permit this rising and falling movement of the cylinder H, it is journaled at each end in a slide L carried in guides $l$ in the frames A', A', and these slides L are connected by connecting rods L' with rocking levers $L^2$ operated by cams 2, 2 on the cam shaft $b$. The rocking levers are fulcrumed as at $l'$ and their free ends which are acted upon by the cams 2, 2 may be provided with rollers $L^3$.

M is the cutter frame which carries the splint cutters and is located below the cylinder H and between the side frames A', A'. This cutter is reciprocated up and down by suitable driving mechanism. For this purpose I have shown the frame connected with an eccentric rod N operated by an eccentric 3 on the cam shaft $b$. The cutter frame M is of suitable construction to hold the cutters. I prefer to construct it in the manner shown, consisting of a lower frame M', a removable cutter plate $M^2$ and a cap plate $M^3$. (See Figs. 8, 9 and 10.) The lower frame M' is hinged to the reciprocating eccentric rod N. It is provided with a flat face $m$ and may have a forward undercut edge $m'$. The cutter plate $M^2$ is adapted to rest upon the flat face $m$ of the frame M' and may have a front undercut edge $m^2$ adapted to fit the undercut $m'$ of the frame M'. By this means the plate M² may be fitted upon the frame M'. On the rear of the plate M² is a depending flange or lug $o$ adapted to extend down over the rear of the frame M' when the plate M² is applied. O are set screws carried by the flange $o$ and adapted to bear against the rear of the frame M'. (See Figs. 13, 14 and 15.) By means of these set screws O, the plate M² may be drawn rearwardly and thus clamped firmly upon the frame M', the undercut flange $m^2$ of the plate being drawn into the under cut $m'$ of the frame. To remove the plate M² it is only necessary to loosen the screws O and move the plate M² forward until its flange $m^2$ is disengaged from the edge $m'$, and the plate may then be raised and removed. The plate M² has a flat upper face $m^3$, and is provided near its ends with transverse ribs M⁴, one or both of which may be provided with a tapered face to receive a tapered key O'. (See Figs. 9 and 13.)

P (Fig. 11) is one of the cutters. These are preferably of the shape shown, of square or rectangular cross section, provided on their ends with rounded cutting eyes $p$. These cutters P are placed side by side upon the face $m^3$ of the plate M² between the end ribs M⁴, M⁴ with their adjacent sides in contact and their cutting edges projecting beyond the edge of the plate M². (See Fig. 13.) The cutters when so placed are clamped together upon the plate by the tapered key or keys O'. To adjust the cutters P in perfect alignment and with their eyes $p$ projecting the proper distance, the plate M² is provided upon its face with a longitudinal rib M⁵ and the cutters are formed with notches $p'$ upon their lower faces adapted to engage the rib M⁵, the notch $p'$ being the proper distance from the eye $p$ of the cutter to cause the eye to project the exact distance required.

It is obvious that instead of forming the rib M⁵ upon the plate and the notch $p'$ upon the cutter, these features may be reversed, and a longitudinal groove may be formed upon the surface of the plate, and the cutters may be provided with ribs or lugs to engage it. This is obviously a mere reversal of the construction shown. The cutter may be made with an eye $p$ at each end and the lug or groove $p'$ at the middle equidistant from the eyes. The cutter is then reversible. This modified construction is shown in Fig. 12.

As the cutting eyes are liable to become broken I so construct the cutters that they are not totally destroyed thereby but may be provided with new eyes and used again. For this purpose I provide each cutter with a series of auxiliary notches or lugs $p^2$ located in the rear of the first notch $p'$ and properly spaced. If the eye of any cutter becomes broken it is only necessary to cut off the broken eye and form a new one on the edge of the cutter. This new eye will be of exact distance from the next notch or lug $p^2$ and in applying this cutter the second notch or lug is fitted on the rib or groove M⁵. Before the eye is cut the temper should be drawn from the end of the cutter and it should be tempered again after the new eye is cut. Should the second eye become broken a third may be cut and a third notch is then use, and so on. With the modified construction shown in Fig. 12 when the eye is broken, the cutter may be reversed and the other eye is used.

The block of wood from which the splints are cut is fed intermittently to the cutters, so that with each downward movement of the cutter frame a series of splints are cut, which are delivered to the apron B as the cutters ascend.

I prefer to arrange the devices for feeding the wood at an angle to the cutters so that the wood will be cut on a diagonal line. This is clearly shown in Fig. 7.

Q is the wood feeding box, which preferably consists of two frames Q' Q², bolted together and forming a hollow chute or guide for the wood R. This feeding box Q is suitably secured to the side frames and has its delivery end located below the cylinder H and adjacent to the line of movement of the cutters. In the drawings I have shown the frames Q' Q² each provided with an internal intermediate rib $q$, which forms an internal partition dividing the chute or guide into two adjacent guideways. With this construction two wooden blocks are employed, one in each guideway. This is of course immaterial, and the intermediate ribs $q$ may be omitted.

The wooden block is fed through the box Q by means of suitable feeding rollers S, S. These rollers I have shown arranged in pairs in the top and bottom of the box Q and contained in suitable enlargements $s$ in the frames Q', Q². These feed rollers S, S are corrugated longitudinally, or otherwise roughened, so as to bite upon the surface of the wood and feed it along by a positive feeding action. The feed rollers are journaled in the frame of the box Q and are operated intermittently by suitable devices. For this purpose I have shown the roller journals projecting at one end through the box Q and provided with ratchets T, which are driven by pawls $t$, carried by a reciprocating slide T'. The slide T' is guided in suitable guides $s'$ and is reciprocated intermittently back and forth by a lever U fulcrumed as at $u$ and operated by a cam on the cam shaft $b$, the lever being connected with the slide T' through a connecting rod T² and a bell crank $t'$, whereby the intermittent vertical movement of the lever U under the action of the cam 4, imparts an intermittent horizontal movement to the slide T'. By this means the feed rollers S, S are operated intermittently and feed the wood by a positive intermittent movement to the cutters. $t^2$ is the usual pawl to prevent backward rotation of the ratchets T.

E' is a rotary drum journaled in the vessel E which contains the igniting compound, and is partly submerged therein. This drum E' may be driven by a pulley E². As the belt or apron B carrying the splints passes over the vessel E the ends of the splints graze or pass close to the surface of the drum E', and receive the igniting compound from the surface of the drum. The drum E' is preferably driven at the same speed as the traveling apron. As the drum is partially submerged in the material and rotates, its surface becomes coated with the compound. The vessel E may be provided with a steam compartment E⁴ to keep the mixture in the vessel in a liquid condition. The drum E' is of the width of the carrier B but the vessel E is longer so as to have an extension E⁵ beyond the drum, through which the contents of the vessel may be examined and tempered while the apparatus is in operation. This extension may be provided with a cover or door E⁶. (See Fig. 18.)

Figures 18, 19:
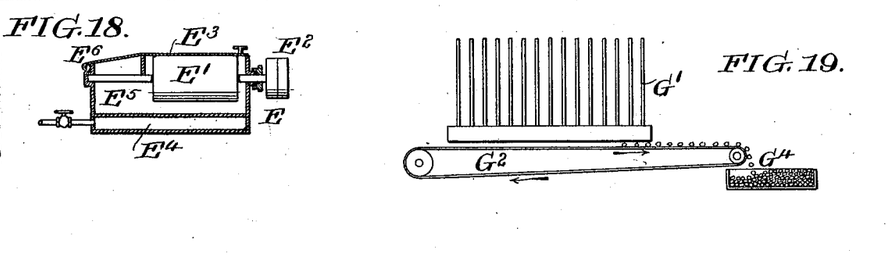
Fig. 18 is a longitudinal vertical sectional view of the vessel for containing the igniting compound and applying it to the match-splints.
Fig. 19 is is a front elevation of the splint-discharging drum, showing the devices for receiving and conveying the matches discharged thereby.

As there is possibility of the mixture in the vessel becoming ignited, the vessel E may be provided with a hood or cover E³, which may be immediately closed over the vessel, if its contents become ignited, so as to smother the fire. To remove the apron and matches from the vessel E under such conditions I construct the guide F, over which the apron or belt passes adjacent to the vessel E so that it may be instantly pulled or moved away. In the drawings I have shown the guide F suspended from a chain or cable F² passing over a pulley $f$ arranged at an elevation. The free end of the chain or cable may be fastened to or near the vessel E, so that an attendant may immediately seize it and elevate the guide F and the apron B, at the same time closing the hood or cover E³. The guide F may be carried on a lever F³ hinged to a standard or bracket.

From the foregoing description of the construction, the mode of operation of the apparatus will be readily understood.

Figure 13:
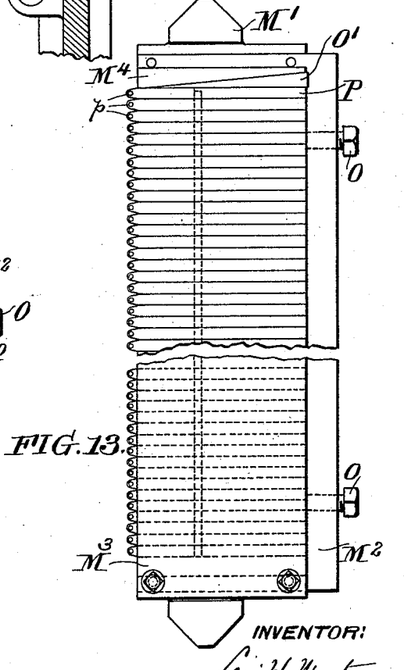
Fig. 13 is a plan view of the cutter-frame and cutters with the top or cap plate removed to show the cutters.
Figures 14, 16:
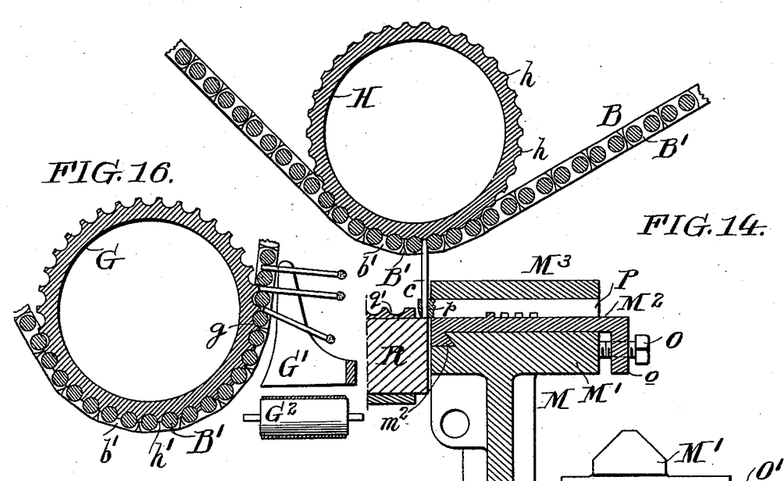
Fig. 14 is a longitudinal vertical sectional view of part of the machine on the line $w\,w$ of Fig. 7, with the splint receiving and carrying apron included.
Fig. 16 is a vertical sectional view of the match-discharging devices and a portion of the splint receiving and carrying apron.
Figure 15:
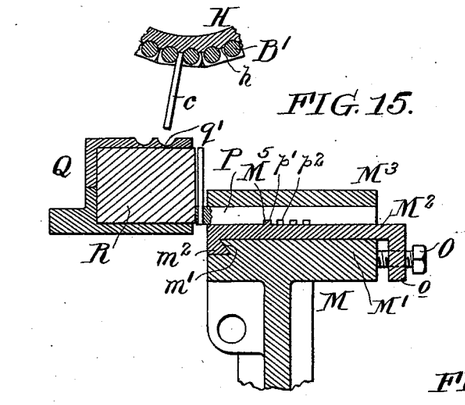
Fig. 15 is a similar view with part omitted, illustrating the operation of the splint-cutting mechanism.

The wood from which the splints are to be cut is placed in the feed box Q, with its diagonal end at front of the box. As the cam shaft $b$ rotates, motion is imparted to the various parts of the machine from the cams 1, 2, 4, and the eccentric 3. The wood is fed forward in the box Q by the rollers S, S, until its front edge extends just beyond the line of movement of the cutter eyes $p$. The wood is brought into this position when the cutter frame is raised as is shown in Fig. 14. Further movement of the wood then ceases owing to the intermittent action of the feeding rollers S, S. The cutter frame now descends and the cutters P cut from the projecting edge of the wood a series of splints $c$ which pass up through the eyes $p$ when the cutter frame descends as is shown in Fig. 14. Meanwhile by the operation of the cylinders H, H' in the manner heretofore described, the belt or apron B is moved so that a new pair of bars B', B', is brought in position to receive the splints. The operation of the belt is then interrupted and the cutter frame M ascends, carrying the splints $c$ which are retained in the cutter eyes $p$. When the cutter has reached its highest position, and the upper ends of the splints $c$ are just in position to enter the space between the bars B', B', the feeding rollers S, S are again operated and feed the edge of the wood immediately under the raised cutters, as is shown in Fig. 13. The depression of the cylinder H, through the operation of the levers L² and connections L', L' now takes place. This movement of the cylinder H carries down the belt or apron B, so that the two bars B' B' are pushed over the upper ends of the splints and hold them.

The wood R lying below the cutters P acts as a support for the lower ends of the splints $c$ and thus prevents them being pushed down through the cutter eyes $p$ without engaging the space between the two bars B' B'. The teeth or ribs $h$ upon the surface of the cylinder should be of small height so as not to project through the space between the bars B' B' and thus obstruct the introduction of the ends of the splints. If desired, the teeth or ribs $h$ may be omitted through the body of the cylinder and may be located only at the ends, but I prefer to arrange them through the entire length of the cylinder, because they then act as stops to prevent any of the splints being pushed too far into the space between the bars of the apron, and serve to keep all the splints of even projecting length, so that their ends will properly take the compounds. When a row of splints has been introduced into the apron in the manner described, the cutter frame M commences to descend and to cut a second row of splints. The new splints, which are thus being cut and pass through the eyes $p$ of the cutter, free the previously cut splints from the eyes. At the same time the cylinder H ascends lifting the apron and the splints that have just been introduced into it, and the feeding action of the cylinders H, H', under the action of their driving devices feeds the belt along and brings the next pair of bars B' B' into position to receive the next set of splints which have meanwhile been cut by the cutters P in the manner described.

The successive sets of bars B' B' between which splints are introduced should be of such a distance apart, or the amount of feeding movement of the belt B between each operation, should be sufficient to move the bars B' B' between which the row of splints has been introduced sufficiently far in the ascending direction of the belt as it passes to the guides I, I that those splints will not strike the top of the feed box or frame when the belt is carried down by the cylinder H to receive the next row of splints. The top of the feed box Q may be grooved as at $q'$ so that the ends of the splints will not strike it when the apron descends. In this manner the belt B becomes provided with rows of splints $c$ which pass between the guides I, I in the direction of the arrow in Fig. 17, to the first bath C where the belt passes under the roller or guide D and is slightly depressed so that the ends of the splints are dipped in the contents of the vessel. The belt then passes under the guide F and the splints graze the surface of the drum E' from which they receive the igniting compound. The construction of the matches is now completed. It remains for the ends to dry and for the matches to be discharged from the apron.

To dry the matches the belt may be carried about suitable guides F' for a sufficient distance, and may if desired, pass through a drying chamber or inclosure. Before again passing to the splint cutting machine the belt passes about a discharge drum G. This drum is similar to the drums H or cylinders H, H', except that the ribs or teeth $g$ thereof are higher than the ribs or teeth $h$, so that they will project for a greater distance in the space between the bars B' B' and will expel the finished matches. This operation is illustrated in Fig. 16.

For the purpose of receiving the matches from the ejector G, I prefer to employ devices such as are shown in Fig. 19. Arranged adjacent to the discharge drum G is a comb G', the teeth or fingers of which are spaced to receive a match between them as the matches are ejected from between the bars of the belt by the ejector G. Below the comb G' is a transversely arranged belt or carrier $G^2$ which receives the matches as they fall from the comb and may be used to convey them directly to the boxes $G^4$. As the matches fall between the teeth of the comb G' they will be neatly disposed upon the traveling belt transversely thereto and will therefore fall properly into the box. The belt or carrier $G^2$ may be driven in any suitable manner as by connection with the drum G.

It is apparent that the operations of the various parts of the splint cutting machine must be accurately timed with reference to one another, and to permit an adjustment of these various devices I prefer to provide each of driving connections or devices with features of adjustability. For this purpose I have shown the connecting rods K', L', L' and $T^2$ constructed of two pieces provided on their ends with right and left threads received in a complementarily threaded union V, by turning which the sections of the rod may be drawn together or forced apart thus lengthening or shortening the rod.

Such details of construction as have been shown and described for the purpose of illustrating and explaining the invention, are not to be taken as limitations, but may be varied without departing from the invention.

What I claim as new, and desire to secure by Letters Patent, is—

1. In a match making machine, the combination of a movable splint carrying apron, a reciprocating splint cutter and means to intermittently depress the splint carrying apron toward the cutter to take the splints therefrom.

2. In a match making machine, the combination of a splint carrying apron, an intermittently operated driving cylinder for said apron, a reciprocating splint cutter, and means to intermittently depress the driving cylinder toward the cutter to cause the apron to receive the splints.

3. In a match making machine, the combination of a movable splint carrying apron, a reciprocating splint cutter, feeding devices for feeding a block of wood to the cutter, means to intermittently operate the splint cutter and wood feeding devices respectively, so timed that the wood is fed under the cutters when they are in a raised position, and means to depress the splint carrying apron toward the cutter after the wood feeding devices have operated.

4. In a match making machine, the combination of a splint carrying apron, an apron driving cylinder or drum below which said apron passes, means to intermittently rotate said cylinder or drum, a reciprocating splint cutter, and means to intermittently depress the apron driving cylinder toward the cutter.

5. In a match making machine, the combination of a splint carrying apron, an apron driving cylinder or drum under which said apron passes, a reciprocating splint cutter and alternately operating means to intermittently rotate the apron driving cylinder or drum and to depress it toward the cutter.

6. In a match making machine, the combination of two driving cylinders or drums, a splint carrying apron or drum passing above one cylinder or drum and below the other, means to intermittently rotate said cylinders or drums in opposite directions, a reciprocating splint cutter located below the cylinder or drum under which the apron passes, and means to intermittently depress the latter cylinder or drum and thereby carry the apron toward the splint cutter.

7. In a match making machine, the combination of two driving cylinders or drums, a splint carrying apron or drum passing above one cylinder or drum and below the other, means to intermittently rotate said cylinders or drums in opposite directions, a reciprocating splint cutter located below the cylinder or drum under which the apron passes, means to intermittently depress the latter cylinder or drum and thereby carry the apron toward the splint cutter, and guides for said apron beyond the latter cylinder or drum.

8. In a match making machine, the combination of two driving cylinders or drums provided with oppositely arranged ratchets, a rock shaft, pawls carried by said rock shaft on opposite sides thereof and engaging said ratchets, means to intermittently operate said rock shaft, a splint carrying apron passing over one cylinder or drum and under the other, and a cutter to cut a series of splints and deliver them to the apron.

9. In a match making machine, the combination of a splint carrying apron, a reciprocating cutter, intermittently operating devices to feed a block of wood to the cutter, and means to intermittently drive the apron and depress it toward the cutter.

10. In a match making machine, the cutter frame consisting of a base frame, and a removable cutter carrying plate provided upon its upper surface with transverse end ribs M² and a continuous longitudinal guide for holding a series of cutters in alignment.

11. A cutter carrying plate for a match making machine provided with a flat surface, and transverse end ribs and a continuous longitudinal guide for holding a series of cutters in alignment.

12. The combination of a cutter plate of a match making machine and the cutter adapted thereto, said cutter plate and cutter being provided with an engaging device consisting of a projection on one of the parts and a recess on the other, the member of the engaging device which is carried by the cutter plate being continuous to permit the cutter to be moved laterally thereon without disengagement or affecting its longitudinal adjustment.

13. The combination of a cutter plate of a match making machine and a cutter adapted thereto provided with a series of engaging parts located at different distances from the eye of the cutter plate, the cutter being provided with a complementary longitudinal continuous engaging part adapted to engage any one of the engaging parts of the cutter and permit the cutter to be moved laterally without disengagement or affecting its longitudinal adjustment.

14. In a match making machine, the combination with the cutter frame of a cutter plate carried thereby, provided with transverse shoulders at its ends and a continuous longitudinal engaging part on its face, a series of splint cutters lying side by side upon the face of the cutter plate between the transverse ribs and provided with an engaging part adapted to engage the longitudinal engaging part on the face of the cutter plate to hold the cutters in longitudinal adjustment with freedom of lateral movement, and a key to clamp said cutters firmly between said shoulders at the ends of the cutter plate.

In testimony of which invention I have hereunto set my hand.

L. H. MONTROSS.

Witnesses:
ERNEST HOWARD HUNTER,
JAMES HOWLAND.